(12) United States Patent
Xiong et al.

(10) Patent No.: US 12,147,627 B2
(45) Date of Patent: Nov. 19, 2024

(54) DISPLAY PANEL AND METHOD FOR MANUFACTURING SAME

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Ren Xiong, Beijing (CN); Guiyu Zhang, Beijing (CN); Huiqiang Song, Bejing (CN); Lei Yang, Beijing (CN); Fengping Wu, Bejing (CN)

(73) Assignees: BEIJING BOE TECHNOLOGY DEVELOPMENT CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/783,090

(22) PCT Filed: Mar. 19, 2021

(86) PCT No.: PCT/CN2021/081893
§ 371 (c)(1),
(2) Date: Sep. 22, 2022

(87) PCT Pub. No.: WO2022/193319
PCT Pub. Date: Sep. 22, 2022

(65) Prior Publication Data
US 2024/0176444 A1 May 30, 2024

(51) Int. Cl.
*G06F 3/041* (2006.01)

(52) U.S. Cl.
CPC ........ *G06F 3/04164* (2019.05); *G06F 3/0412* (2013.01); *G06F 2203/04102* (2013.01); *G06F 2203/04103* (2013.01)

(58) Field of Classification Search
CPC .............. G06F 3/04164; G06F 3/0412; G06F 2203/04102; G06F 2203/04103
See application file for complete search history.

(56) References Cited

U.S. PATENT DOCUMENTS

| 10,386,958 B2* | 8/2019 | Xu ........................ G06F 3/0412 |
| 2011/0141042 A1* | 6/2011 | Kim ...................... G06F 3/0412 345/173 |

(Continued)

FOREIGN PATENT DOCUMENTS

| CN | 106646983 A | 5/2017 |
| CN | 107515699 A | 12/2017 |

(Continued)

*Primary Examiner* — Ibrahim A Khan
(74) *Attorney, Agent, or Firm* — Lippes Mathias LLP

(57) ABSTRACT

Provided is a display panel. The display panel includes: a display substrate, provided with a display region and a peripheral region surrounding the display region; and a touch layer laminated on the display substrate, wherein the touch layer includes a plurality of touch electrodes and a plurality of traces, orthographic projections of the plurality of touch electrodes on the display substrate being within the display region, and orthographic projections of the plurality of traces on the display substrate being within the peripheral region.

12 Claims, 7 Drawing Sheets

(56) References Cited

U.S. PATENT DOCUMENTS

| | | | | |
|---|---|---|---|---|
| 2012/0139829 A1* | 6/2012 | Anno | G02F 1/133512 | |
| | | | 345/204 | |
| 2012/0247938 A1* | 10/2012 | Saito | G06F 3/0445 | |
| | | | 200/600 | |
| 2013/0000954 A1* | 1/2013 | Hashimoto | G03F 7/405 | |
| | | | 174/250 | |
| 2013/0038542 A1* | 2/2013 | Kim | G06F 3/041 | |
| | | | 345/173 | |
| 2013/0228442 A1* | 9/2013 | Mohaptatra | G06F 3/0445 | |
| | | | 200/600 | |
| 2014/0009400 A1* | 1/2014 | Poorter | G06F 3/04164 | |
| | | | 345/173 | |
| 2014/0375597 A1* | 12/2014 | Park | G06F 3/0443 | |
| | | | 345/173 | |
| 2015/0002759 A1* | 1/2015 | Nakano | G06F 3/0412 | |
| | | | 349/12 | |
| 2015/0122623 A1* | 5/2015 | Kim | H03K 17/9618 | |
| | | | 200/5 R | |
| 2016/0048228 A1* | 2/2016 | Lee | G06F 3/04164 | |
| | | | 345/173 | |
| 2016/0062524 A1* | 3/2016 | Tang | B32B 37/1284 | |
| | | | 156/247 | |
| 2017/0010712 A1* | 1/2017 | Yoshizumi | G06F 3/0443 | |
| 2018/0246610 A1* | 8/2018 | Yang | G06F 3/0412 | |
| 2019/0014664 A1* | 1/2019 | Ahn | H10K 59/40 | |
| 2019/0064969 A1* | 2/2019 | Kiernan | G06F 3/04166 | |
| 2020/0015355 A1 | 1/2020 | Tian et al. | | |
| 2020/0103691 A1* | 4/2020 | Ohashi | G02F 1/13452 | |
| 2020/0186631 A1* | 6/2020 | Ye | G06F 1/1643 | |
| 2020/0201509 A1* | 6/2020 | Kadowaki | G06F 3/04162 | |

FOREIGN PATENT DOCUMENTS

| | | |
|---|---|---|
| CN | 207337024 U | 5/2018 |
| CN | 108803166 A | 11/2018 |
| CN | 109119448 A | 1/2019 |
| CN | 109388287 A | 2/2019 |
| CN | 109639853 A | 4/2019 |
| CN | 110597420 A | 12/2019 |
| CN | 110703940 A | 1/2020 |
| CN | 210324155 U | 4/2020 |
| CN | 210639597 U | 5/2020 |
| CN | 111524450 A | 8/2020 |

* cited by examiner

DISPLAY PANEL AND METHOD FOR MANUFACTURING SAME

CROSS-REFERENCE TO RELATED APPLICATION

This application is a 371 of PCT application No. PCT/CN2021/081893, filed on Mar. 19, 2021, the content of which is incorporated herein by reference in its entirety.

TECHNICAL FIELD

The present disclosure relates to the field of display technologies, and in particular relates to a display panel and a method for manufacturing the same.

BACKGROUND

With the increase of the screen-to-body ratio of electronic devices, requirements on narrower borders of display panels are getting higher and higher.

Taking a display panel with a touch function as an example, the display panel includes a display substrate and a touch layer disposed on the display substrate, the display substrate is provided with a display region and a peripheral region around the display region, and the touch layer includes a plurality of touch electrodes and a plurality of traces connected to the plurality of touch electrodes, wherein orthographic projections of the plurality of touch electrodes on the display substrate are within the display region, and orthographic projections of the plurality of traces on the display substrate are within the peripheral region. Generally, one end of the each of the traces is connected to a corresponding touch electrode, and the other end of each of the traces is concentrated in a bonding region on a wire outlet side of the display panel. The bonding region is configured to be bonded to a flexible printed circuit (FPC).

One end of these traces may be connected to corresponding touch electrodes through respective borders of the display region, the other ends of the traces may be extended to the wire outlet side of the display panel. The orthographic projections of the other ends of these traces on the display substrate are within the peripheral region and are extended along a direction of an outer edge of the peripheral region. The traces, the orthographic projections of which on the display substrate are within the peripheral region the wire outlet side of the display panel, are arranged at intervals in parallel.

SUMMARY

Embodiments of the present disclosure provide a display panel and a method for manufacturing the same. The technical solutions are as follows.

In an aspect, a display panel is provided. The display panel includes a display substrate and a touch layer.

The display substrate is provided with a display region and a peripheral region surrounding the display region; and the touch layer is laminated on the display substrate and includes a plurality of touch electrodes and a plurality of traces. Orthographic projections of the plurality of touch electrodes on the display substrate are within the display region, and orthographic projections of the plurality of traces on the display substrate are within the peripheral region, wherein ends of the plurality of traces are connected to the corresponding touch electrodes, and the other ends of the plurality of traces are disposed in a plurality of bonding regions arranged at intervals in the touch layer. Orthographic projections of the plurality of bonding regions on the display substrate are within a first peripheral sub-region, the first peripheral sub-region is a partial region, on a side of the display region, of the peripheral region, and the plurality of bonding regions are arranged along an extending direction of an outer edge of the first peripheral sub-region.

Optionally, the peripheral region further includes a second peripheral sub-region and a third peripheral sub-region. The second peripheral sub-region and the third peripheral sub-region are connected to the first peripheral sub-region, and the second peripheral sub-region, the first peripheral sub-region and the third peripheral sub-regions are respectively on sides where three connecting borders of the display region are disposed. The plurality of traces include a first trace, a second trace and a third trace, wherein in an orthographic projection of the touch layer on the display substrate, the first trace is connected to the corresponding touch electrode from a border, close to the first peripheral sub-region, of the display region, the second trace is connected to the corresponding touch electrode from a border, close to the second peripheral sub-region, of the display region, and the third trace is connected to the corresponding touch electrode from a border, close to the third peripheral sub-region, of the display region. The plurality of bonding regions include a first bonding region corresponding to the first trace, a second bonding region corresponding to the second trace and a third bonding region corresponding to the third trace; and the first bonding region is between the second bonding region and the third bonding region.

Optionally, a number of the first bonding region is 2, and a number of the second bonding region and a number of the third bonding region are both 1; or the number of the first bonding region, the number of the second bonding region and the number of the third bonding region are all 1.

Optionally, the touch layer further includes a flexible film; a part of the touch electrodes and the traces are disposed on one surface of the flexible film, and the other part of the touch electrodes and the traces are disposed on the other surface of the flexible film.

The traces in any first bonding region are connected to one first FPC, the traces in any second bonding region are connected to one second FPC, and the traces in any third bonding region are connected to one third FPC; and a part of the first FPC, the second FPC and the third FPC are bonded to the traces on one surface of the touch layer, and the other part of the first FPC, the second FPC and the third FPC are bonded to the traces on the other surface of the touch layer.

Optionally, the first FPC is bonded to the traces on the one surface of the touch layer, and the second FPC and the third FPC are bonded to the traces on the other surface of the touch layer.

Optionally, the display panel further includes a polarizer and an optically clear adhesive (OCA) layer. The polarizer is disposed on a first surface of the touch layer; the OCA layer is adhered between the polarizer and the touch layer, wherein edges of the polarizer and of the OCA layer are provided with first notches, and the first notch is configured to avoid the FPC disposed on the first surface of the touch layer.

Optionally, the OCA layer is adhered to each of the FPCs disposed on a second surface of the touch layer, and the first surface and the second surface are two opposite surfaces of the touch layer.

Optionally, the display panel further includes a driving IC, disposed on the display substrate and in the peripheral region, wherein the bonding region and the driving IC are disposed in the first peripheral sub-region and are arranged alternately along the extending direction of the outer edge of the first peripheral sub-region.

In another aspect, a method for manufacturing a display panel is provided. The method includes: providing a display substrate provided with a display region and a peripheral region surrounding the display region; and forming a touch layer on the display substrate, wherein the touch layer includes a plurality of touch electrodes and a plurality of traces, orthographic projections of the plurality of touch electrodes on the display substrate being within the display region, and orthographic projections of the plurality of traces on the display substrate being within the peripheral region, wherein ends of the plurality of traces are connected to the corresponding touch electrodes, and the other ends of the plurality of traces are disposed in a plurality of bonding regions arranged at intervals in the touch layer, orthographic projections of the plurality of bonding regions on the display substrate are in a first peripheral sub-region, the first peripheral sub-region is a partial region, on a side of the display region, of the peripheral region, and the plurality of bonding regions are arranged along an extending direction of an outer edge of the first peripheral sub-region.

Optionally, forming the touch layer on the display substrate includes: manufacturing a touch film; forming a polarizer and an optically clear adhesive (OCA) layer in sequence on the display substrate; and attaching the touch film to the OCA layer as the touch layer, wherein the OCA layer is adhered between the polarizer and the touch layer.

Optionally, manufacturing the touch film layer includes: providing a flexible film; forming the touch electrodes and the traces on both surfaces of the flexible film; forming second notches in portions, corresponding to the bonding regions, of the flexible film; and bonding FPCs and the traces at the second notches.

Optionally, the FPCs includes FPCs bonded on one surface of the touch layer and FPCs bonded on the other surface of the touch layer; and forming the polarizer and the OCA layer in sequence on the display substrate includes: forming first notches on the polarizer and the OCA layer, the first notch being configured to avoid the FPC disposed on the one surface of the touch layer; and attaching the polarizer and the OCA layer formed with the first notches to the display substrate.

Optionally, manufacturing the touch film further includes: cutting off portions, on both sides of the second notch, of the flexible film after the FPC and the trace are bonded at the second notch.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to clearly present the objectives, technical solutions, and advantages of the present disclosure.

Figure 1:
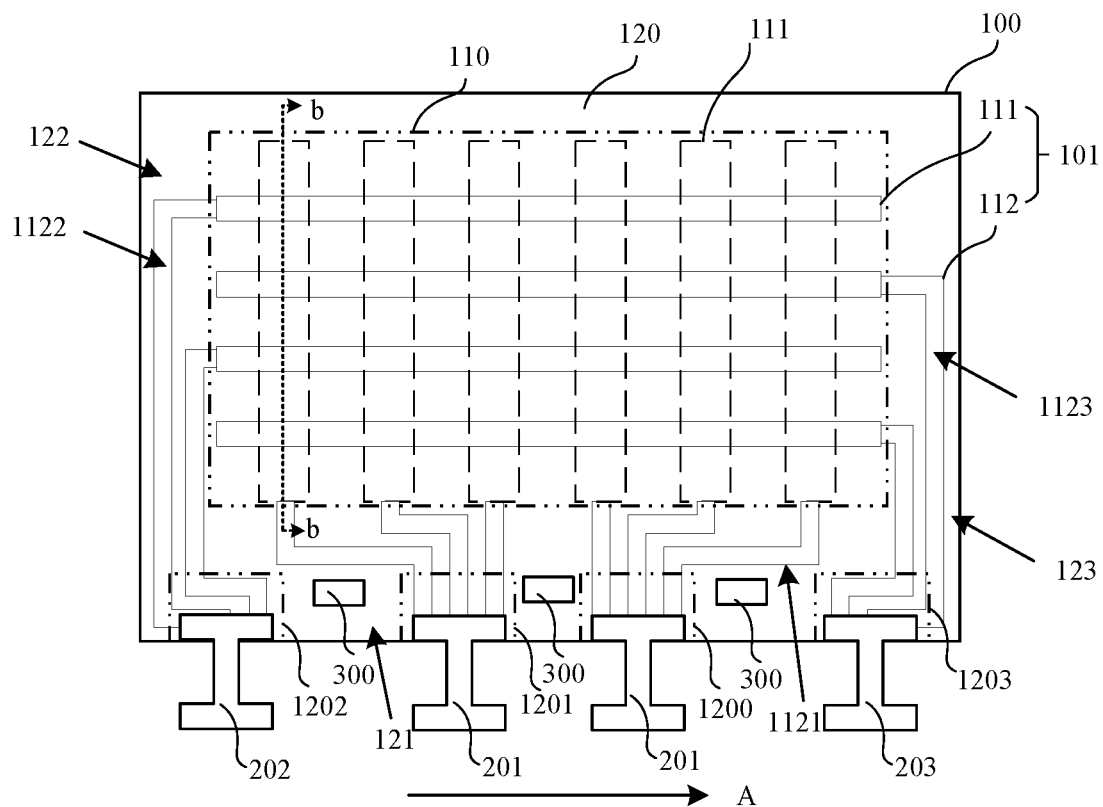
FIG. 1 is a schematic structural diagram of a display panel according to an embodiment of the present disclosure.

FIG. 1 is a schematic structural diagram of a display panel according to an embodiment of the present disclosure. Referring to FIG. 1, the display panel includes a display substrate 100 and a touch layer 101. The touch layer 101 is laminated on the display substrate 100, and the touch layer 101 includes a plurality of touch electrodes 111 and a plurality of traces 112. The traces 112 here are touch traces.

The display substrate 100 is provided with a display region 110 and a peripheral region (also referred to as a peripheral region or a non-display region) 120 surrounding the display region 110. Orthographic projections of the plurality of touch electrodes 111 on the display substrate 100 are within the display region 110, and orthographic projections of the plurality of traces 112 on the display substrate 100 are within the peripheral region 120. Ends of the plurality of traces 112 are connected to corresponding touch electrodes 111 respectively, and the other ends of the plurality of traces 112 are disposed in a plurality of bonding regions 1200 arranged at intervals in the touch layer 101. Orthographic projections of the plurality of bonding regions 1200 on the display substrate 100 are within a first peripheral sub-region 121, and the first peripheral sub-region 121 is a partial region, on a side of the display region 110, of the peripheral region 120. The plurality of bonding regions 1200 are arranged along an extending direction A of an outer edge of the first peripheral sub-region 121. The outside refers to a side, away from the display region 110, of the first peripheral sub-region.

The other ends of the plurality of traces 112 being disposed in the plurality of bonding regions 1200 arranged at intervals refers to: the plurality of traces 112 are divided into a plurality of groups, and the other ends of each group of traces 112 extend to a small region and are bonded here. A pitch between the other ends of two traces in each group of traces 112 is smaller than a pitch between the other ends of two traces in different groups respectively, that is, two traces in the same group have a smaller pitch therebetween and two traces in different groups have a larger pitch therebetween. The small regions to which the plurality of groups of traces 112 extend are arranged at intervals, that is, the other ends of the plurality of groups of traces 112 are arranged at intervals. The bonding region 1200 here refers to a region where the other end of the trace is bonded to a circuit board, that is, the bonding region is a touch bonding region.

In the embodiment of the present disclosure, the orthographic projections of the touch electrodes 111 on the display substrate being within the display region may also be referred to as that the touch electrodes 111 in the touch layer 101 are disposed in the display region. Correspondingly, the orthographic projections of the traces 112 on the display substrate being within the peripheral region may also be referred to as that the traces 112 are disposed in the peripheral region. In the following descriptions, the relationship between other film layers on the display substrate and the display region or the peripheral region is also described in this way. In addition, unless otherwise specified below, the orthographic projection refers to an orthographic projection on the display substrate.

Since the plurality of touch electrodes 111 are distributed in the display region 110 of the display substrate 100, the display region 110 is also a touch function region. The display panel according to the embodiments of the present disclosure is also referred to as a touch screen panel (TSP).

In the embodiment of the present disclosure, the plurality of traces in the touch layer extend to the peripheral region on the same side of the display region. By extending the plurality of traces to different bonding regions for bonding, the traces are prevented from extending to the same position. Since traces in the same bonding region need to be arranged in parallel when extending along a length direction of the first peripheral sub-region, by arranging the plurality of bonding regions at intervals, the traces in different bonding regions can be prevented from being arranged in parallel as much as possible so as to prevent a too wide border due to excessively concentrated traces, which helps achieve a narrow border of the display panel.

For example, the display substrate 100 is an organic light emitting diode (OLED) display substrate. An OLED display substrate generally includes an array substrate and a light-emitting layer on the array substrate.

Optionally, as shown in FIG. 1, the touch electrodes 111 are strip-shaped electrodes, and the strip-shaped electrodes are divided into intersecting lateral electrodes and vertical electrodes. One of the lateral electrode and the vertical electrode is a driving electrode, and the other is a sensing electrode. The driving electrode and the sensing electrode are configured to send a driving signal and receive a sensing signal respectively in a touch sensing process.

Figure 2:
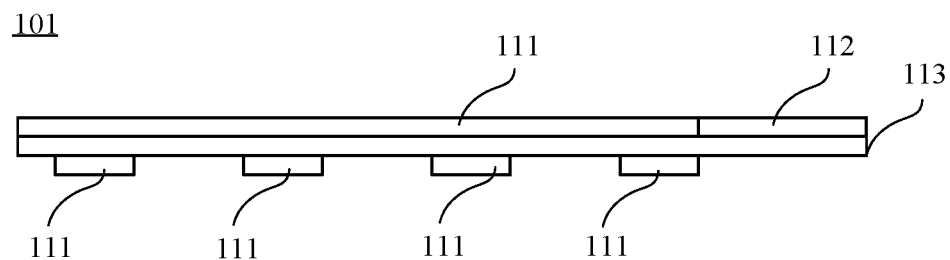
FIG. 2 is a schematic structural diagram of a touch layer according to an embodiment of the present disclosure.

For example, the lateral electrodes and the vertical electrodes are insulated from each other, for example, the lateral electrodes and the vertical electrodes are respectively disposed on two surfaces a layer of flexible film FIG. 2 is a schematic structural diagram of a touch layer according to an embodiment of the present disclosure. FIG. 2 is a sectional view of the touch layer at b-b in FIG. 1. Referring to FIG. 2, the touch layer 101 further includes a flexible film 113, a part of the touch electrodes 111 and the traces 112 are disposed on one surface of the flexible film 113, and the other part of the touch electrodes 111 and the traces 112 are disposed on the other surface of the flexible film 113, that is, both surfaces of the flexible film 113 are provided with the touch electrodes 111 and the traces 112 (traces under the flexible film 113 are not shown in the figure).

For example, the flexible film 113 is a polyethylene terephthalate (PET) film.

FIG. 1 and FIG. 2 are illustrated by taking the touch electrodes 111 being strip-shaped electrodes as an example. In other implementations, the touch electrodes 111 may also be block electrodes or electrodes of other shapes.

In the embodiment of the present disclosure, in addition to the first peripheral sub-region 121, the peripheral region 120 may further include peripheral sub-regions on other sides of the display region. The orthographic projections of the plurality of traces in the display panel on the display substrate are in different peripheral sub-regions. The orthographic projections of these traces on the display substrate all extend to the first peripheral sub-region, and the orthographic projections of these traces are intersected with each other in the first peripheral sub-region. For example, the orthographic projections of traces in the first peripheral sub-region 121 are separated from the orthographic projections of traces in a peripheral sub-region adjacent to the first peripheral sub-region 121 in the first peripheral sub-region 121.

Referring to FIG. 1 again, in addition to the first peripheral sub-region 121, the peripheral region 120 further includes a second peripheral sub-region 122 and a third peripheral sub-region 123. The second peripheral sub-region 122 and the third peripheral sub-region 123 are connected to the first peripheral sub-region 121. The second peripheral sub-region 122, the first peripheral sub-region 121 and the third peripheral sub-region 123 are respectively on sides where three connecting borders of the display region 110 are disposed.

For example, a bottom edge of the display panel is generally a wire outlet side. Correspondingly, the first peripheral sub-region 121 is a peripheral region close to the bottom edge of the display panel, the second peripheral sub-region 122 and the third peripheral sub-region 123 are peripheral regions close to two borders of the display panel. For example, the second peripheral sub-region 122, the first peripheral sub-region 121 and the third peripheral sub-region 123 are on a left side, a lower side and a right side of the display region 110, respectively.

The plurality of traces 112 include a first trace 1121, a second trace 1122 and a third trace 1123. In the orthographic projection of the touch layer 101 on the display substrate 100, the first trace 1121 is connected to a corresponding touch electrode 111 from a border, close to the first peripheral sub-region 121, of the display region 110, the second trace 1122 is connected to a corresponding touch electrode 111 from a border, close to the second peripheral sub-region 122, of the display region 110, and the third trace 1123 is connected to a corresponding touch electrode 111 from a border, close to the third peripheral sub-region 123, of the display region 110. That is, the orthographic projection of the first trace 1121 on the display substrate 100 is connected to the orthographic projection of a corresponding touch electrode 111 on the display substrate 100 from the border, close to the first peripheral sub-region 121, of the display region 110, the orthographic projection of the second trace 1122 on the display substrate 100 is connected to the orthographic projection of a corresponding touch electrode 111 on the display substrate 100 from the border, close to the second peripheral sub-region 122, of the display region 110, and the orthographic projection of the third trace 1123 on the display substrate 100 is connected to the orthographic projection of a corresponding touch electrode 111 on the display substrate 100 from the border, close to the third peripheral sub-region 123, of the display region 110.

The plurality of bonding regions 1200 include a first bonding region 1201 corresponding to the first trace 1121, a second bonding region 1202 corresponding to the second trace 1122, and a third bonding region 1203 corresponding to the third trace 1123.

As shown in FIG. 1, the first bonding region 1201 is between the second bonding region 1202 and the third bonding region 1203.

Since the first peripheral sub-region 121 is connected between the second peripheral sub-region 122 and the third peripheral sub-region 123, correspondingly, by arranging the first bonding region 1201 between the second bonding region 1202 and the third bonding region 1203, traces from respective peripheral regions may not intersect, which is convenient for trace layout and ensures the smallest width of the first peripheral sub-region, thereby facilitating a narrow border design.

As shown in FIG. 1, a part of the lateral electrodes are connected to traces of which the orthographic projections are within the second peripheral sub-region 122, and the other part of the lateral electrodes are connected to traces of which the orthographic projections are within the third peripheral sub-region 123. Generally, the number of the lateral electrodes connected to the traces of which the orthographic projections are within the second peripheral sub-region 122 and the number of the lateral electrodes connected to the traces of which the orthographic projections are within the third peripheral sub-region 123 are the same. It should be noted that FIG. 1 is a simple schematic diagram of the structure of the display panel, only a small number of touch electrodes and traces are shown for example, and the actual number of the touch electrodes and traces in the display panel is much greater than the number shown in FIG. 1.

As shown in FIG. 1, the number of the first bonding regions 1201 is 2, and the number of the second bonding region 1202 and the number of the third bonding region 1203 are both 1. The two first bonding regions here may respectively correspond to two parts of traces of which the orthographic projections are within the first peripheral sub-region 121, and these two parts of traces may be disposed on the left and right sides of a center line of the first bonding region.

In other implementations, the number of the first bonding region 1201, the number of the second bonding region 1202 and the number of the third bonding region 1203 are all 1.

Generally, in the case of a large number of traces, more bonding regions may be provided.

As shown in FIG. 1, the traces 112 in any first bonding region 1201 are connected to one first flexible printed circuit (FPC) 201, the traces 112 in any second bonding region 1202 are connected to one second FPC 202, and the traces 112 in any third bonding region 1203 are connected to one third FPC 203.

Different numbers of bonding regions correspond to different numbers of FPCs, and different numbers of FPCs are suitable for different touch protocol schemes. For example, in the case that 4 bonding regions are provided, the corresponding number of FPCs is 4, as shown in FIG. 1, which is suitable for a 4FPC scheme corresponding to Microsoft Pen (MPP) protocol; in the case that 3 bonding regions are provided, the corresponding number of FPCs is 3. For example, only one of the first FPCs 201 in FIG. 1 is reserved, which is suitable for a 3FPC scheme corresponding to Wacom's Active Electro Static (AES) protocol.

A part of the first FPC 201, the second FPC 202 and the third FPC 203 are disposed on one surface of the touch layer 101 and are bonded to traces 112 on the surface of the touch layer 101, and the other part of the first FPC 201, the second FPC 202 and the third FPC 203 are disposed on the other surface of the touch layer 101 and are bonded to traces 112 on the other surface of the touch layer 101.

As described above, since the touch electrodes 111 and the traces 112 are both distributed on two sides of the touch layer 101, correspondingly, the FPCs bonded to the traces 112 are also disposed on the two sides of the touch layer 101.

For example, the first FPC 201 is disposed on one surface of the touch layer 101 and is bonded to the traces 112 on the surface of the touch layer 101; and the second FPC 202 and the third FPC 203 are disposed on the other surface of the touch layer 101 and are bonded to the traces 112 on the other surface of the touch layer 101.

Referring to FIG. 1 again, the display panel further includes a driving integrated circuit (IC) 300 disposed on the display substrate 100 and in the peripheral region.

The orthographic projection of the bonding region 1200 on the display substrate 100 and the driving IC 300 are disposed in the first peripheral sub-region 121 and are arranged alternately along the extending direction A of the outer edge of the first peripheral sub-region 121. Since the driving ICs are overlapped with the FPCs, the traces, and the like in a height direction, that is, interference would occur if the driving ICs and the traces (or FPCs) are disposed at the same position above the display substrate, such design prevents the interference between the ICs and the FPCs in the horizontal position and achieves mutual avoidance. Additionally, the side-by-side arrangement facilitates the narrow border.

For example, the driving IC 300 is a display driving IC and is configured to drive the display substrate to display. The display driving IC may be a source driving IC.

As shown in FIG. 1, by arranging the plurality of bonding regions at intervals, the driving ICs 300 not only can be disposed between the plurality of bonding regions, but also can be distributed between a plurality of groups of traces. That is, the plurality of groups of traces are led out from intervals among a plurality of driving ICs, which solves the problem of an excessively wide border caused by the space of touch traces being compressed by driving ICs in the related art, thereby achieving a narrow border design of the display panel. Here, one group of traces refers to traces that extend to the same bonding region.

In addition, through the trace design in the embodiments of the present disclosure, the problem of collision between accumulated traces and the driving IC is avoided, and the safety of the driving IC is improved.

Figure 3:
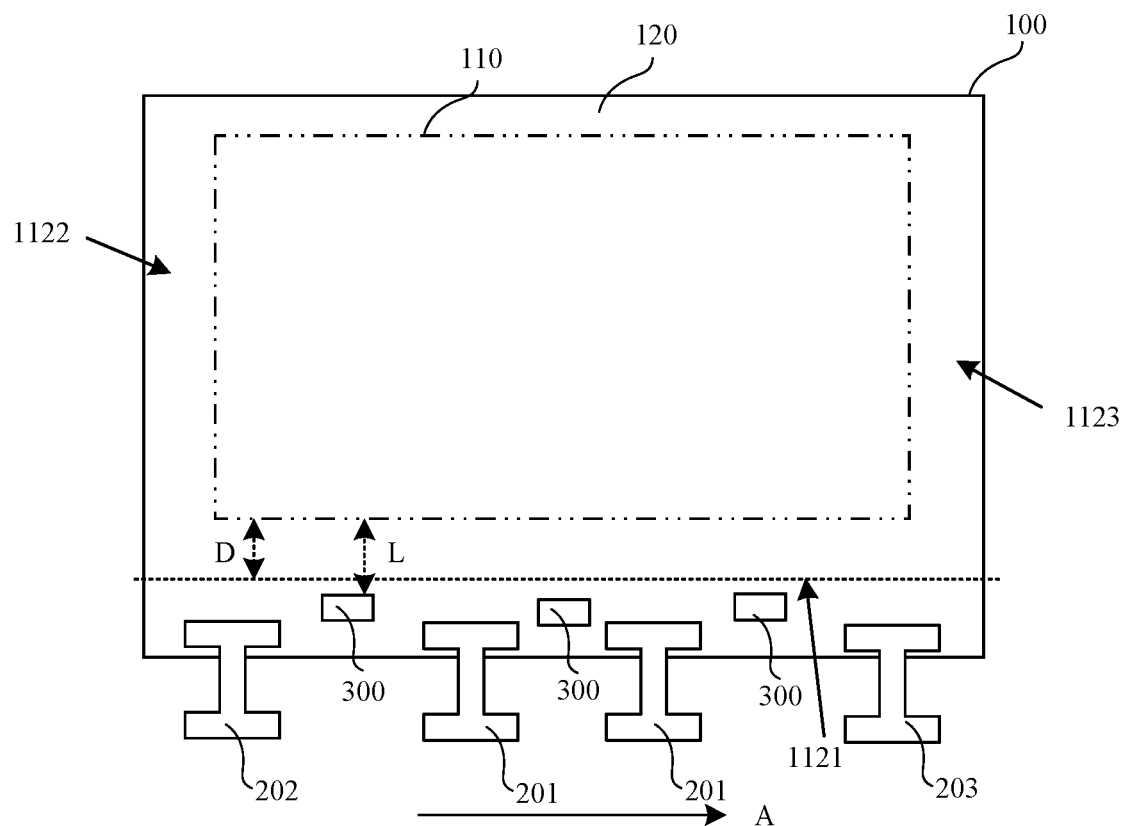
FIG. 3 is a schematic diagram of a position of a driving IC in a display panel according to an embodiment of the present disclosure.

Taking a 14-inch product as an example, FIG. 3 is a schematic diagram of a position of a driving IC in a display panel according to an embodiment of the present disclosure. Referring to FIG. 3, a distance L from the driving IC 300 to the border of the display region 110 is 2.915 mm. In the related art, in the case that traces are led out from the same region of the peripheral region, the width of the space for traces from the touch layer to the lower border in a panel column direction is 3.78 mm. In this case, interference occurs between positions of the touch layer and the driving IC. In the case that the trace scheme according to the present disclosure is applied, the width D of the space for traces from the touch layer to the lower border in the panel column direction is 2.615 mm, and there is no interference between positions of the touch layer and the driving IC, which satisfies design requirements.

Figure 4:
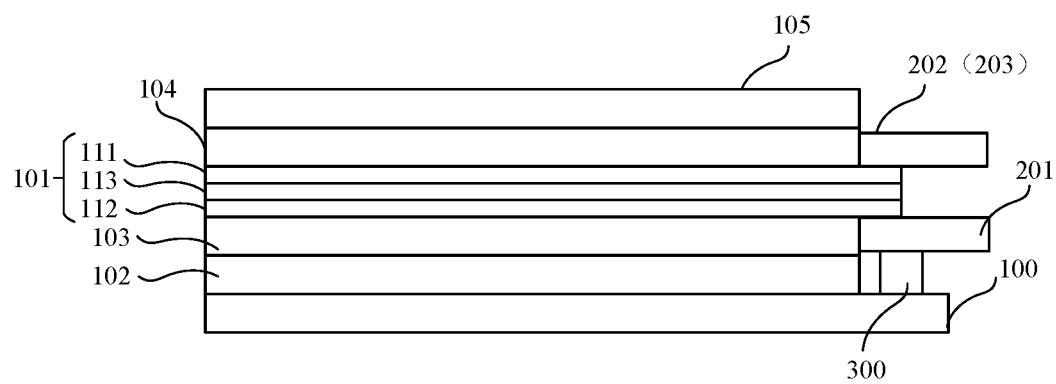
FIG. 4 is a schematic diagram of a layer structure of a display panel according to an embodiment of the present disclosure.

FIG. 4 is a schematic diagram of a layer structure of a display panel according to an embodiment of the present disclosure. Referring to FIC. 4, the display panel further includes: a polarizer (POL) 102 and an optically clear adhesive (OCA) layer 103. The polarizer 102 is disposed on the display substrate 100, and the optically clear adhesive layer 103 is adhered between the polarizer 102 and the touch layer 101.

The OCA layer 103 is disposed under the touch layer 101, so it may also be referred to as a lower OCA layer.

Referring to FIG. 4 again, the display panel further includes an upper OCA layer 104 and a transparent cover plate 105 which are laminated on the touch layer 101 in sequence.

For example, the transparent cover plate 105 is a glass cover plate or a plastic cover plate.

As shown in FIG. 4, the driving IC 300 protrudes from the surface of the display substrate 100. Therefore, the polarizer 102 and the OCA layer 103 both need to avoid the driving IC 300.

Figure 5:
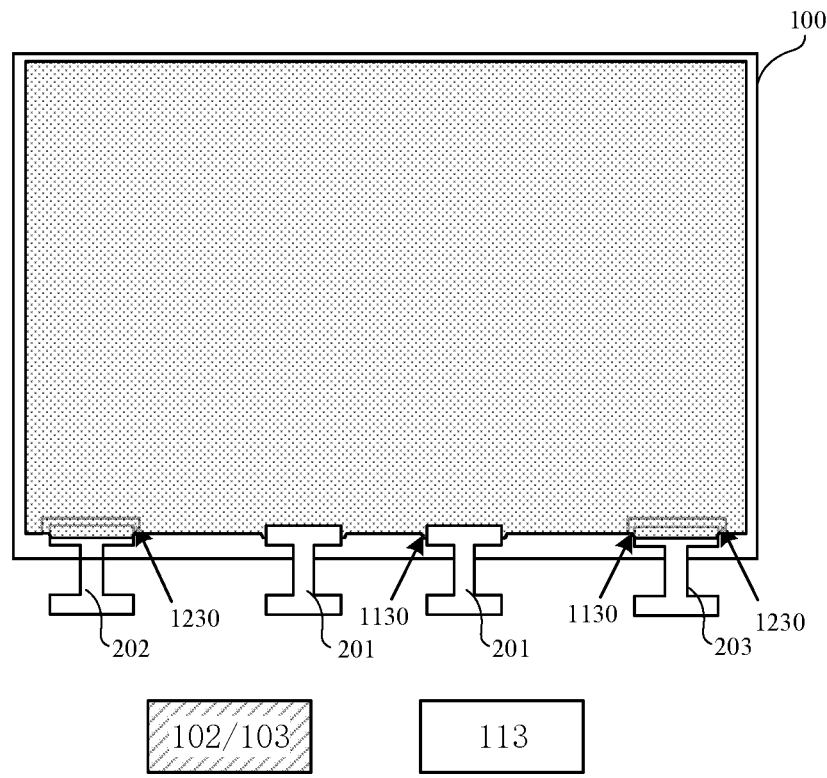
FIG. 5 is a schematic diagram of positions of film layers in a display panel according to an embodiment of the present disclosure.

FIG. 5 is a schematic diagram of positions of film layers in a display panel according to an embodiment of the present disclosure. Referring to FIG. 5, the edges of the polarizer 102 and the OCA layer 103 are provided with first notches 1230, which is configured for avoiding the FPC disposed on the side, facing the display substrate 100, of the touch layer 101, that is, the FPC on the side, facing the display substrate 100, of touch layer 101 is actually disposed between the touch layer 101 and the display substrate 100, and no polarizer 102 and no OCA layer 103 are provided between the FPC and the display substrate. By providing the first notches 1230 to avoid the FPC, the planarization of the display panel can be improved.

As shown in FIG. 5, the polarizer 102 and the OCA layer 103 are provided with the first notches 1230 at positions thereof corresponding to the second FPC 202 and the third FPC 203, and are provided with no first notch at a position thereof corresponding to the first FPC 201.

In the solution provided in FIG. 4, since the polarizer 102 is disposed between the display substrate 100 and the touch layer 101, in the case that the polarizer 102 is arranged above the touch layer 101, that is, in the case that the polarizer is disposed between the touch layer 101 and the transparent cover plate 105, the polarizer 102 and the upper OCA layer 104 are provided with the first notches. The first notch is configured to avoid the FPC on the side, facing away from the display substrate 100, of the touch layer 101.

Referring to FIG. 5, in the touch layer 101, the flexible film 113 is provided with outward protrusions 1130 at positions thereof corresponding to the FPCs. The protrusions 1130 correspond to the bonding regions, and the main function of the protrusions 1130 is to facilitate bonding of the FPCs and the traces (not shown in FIG. 5) the flexible film.

The polarizer 102 and the OCA layer 103 are only provided with the first notches at the positions thereof corresponding to the FPCs on the side, facing the display substrate 100, of the touch layer 101. Therefore, for FPCs on the side, facing away from the display substrate 100, of the touch layer 101, after these FPC are bonded with the touch layer, the protruding parts of these FPCs may be in contact with the OCA layer 103, such that the OCA layer 103 is adhered to each FPC on the side, facing away from the display substrate 100, of the touch layer 101.

In the case that the polarizer 102 is disposed on the touch layer 101, the upper OCA layer 104 is adhered to each FPC on the side, facing the display substrate 100, of the touch layer 101.

That is, the polarizer 102 is disposed on a first surface of the touch layer 101, the first notch 1230 is configured to avoid the FPC disposed on the first surface of the touch layer 101, and the OCA layer adhered to the polarizer 102 is adhered to each FPC disposed on a second surface of the touch layer 101. The first surface and the second surface are two opposite surfaces of the touch layer 101.

Figure 6:
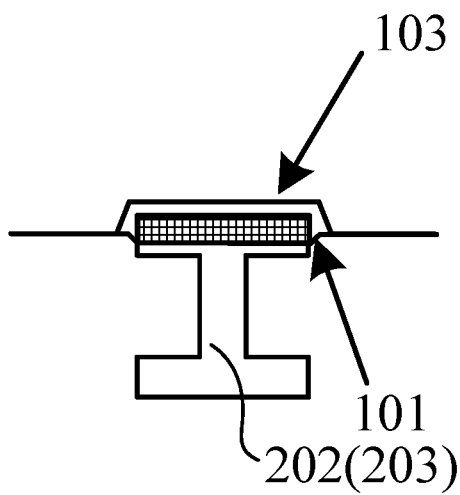
FIG. 6 is an enlarged schematic diagram of bonding positions of a second FPC and a third FPC in FIG. 5.

FIG. 6 is an enlarged schematic diagram of bonding positions of the second FPC and the third FPC in FIG. 5. Referring to FIG. 6, on both sides of the bonding region, the edge of the touch layer 101 and the edge of the OCA layer 103 are almost overlapped; and in the bonding region, the OCA layer 103 is recessed inward due to the first notch, and the touch layer 101 has the aforementioned protrusions. In this case, when the FPC is bonded to the bottom surface of the touch layer, the OCA layer and the polarizer below may not cause interference to the FPCs.

Figure 7:
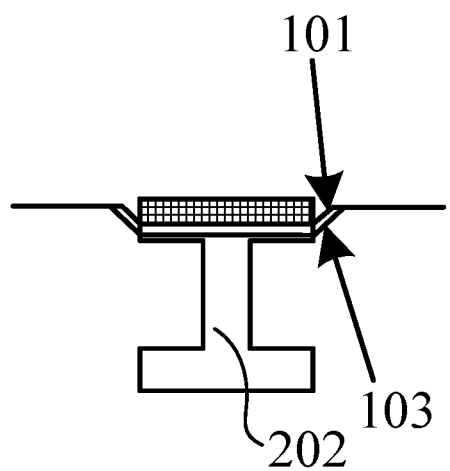
FIG. 7 is an enlarged schematic diagram of a bonding position of a first FPC in FIG. 5.

FIG. 7 is an enlarged schematic diagram of a bonding position of the first FPC in FIG. 5. Referring to FIG. 7, the edge of the touch layer 101 and the edge of the OCA layer 103 are almost overlapped on two sides of the bonding region, while the touch layer 101 has the aforementioned protrusions in the bonding region. Similarly, the OCA layer 103 also has outward protrusions at the bonding region, and an outwardly protruding degree of the OCA layer 103 is greater than that of the touch layer 101. After the FPC and a top surface of the touch layer are bonded, a surface, facing the OCA layer 103, of the part of the FPC protruding from the protruding edge of the touch layer 101 may be adhered to the protrusion of the OCA layer 103 for mechanical fixing.

In FIG. 6 and FIG. 7, the shaded region represents the portion, bonded to the touch layer, of the FPC.

For example, a thickness of the display substrate 100 is 10 μm, a thickness of the polarizer 102 is 147 μm, a thickness of the OCA layer 103 is 100 μm, a thickness of the flexible film 113 in the touch layer 101 is 50 μm, the surface resistivity of flexible film 113 is less than 10 ohm/sq, a thickness of the upper OCA layer 104 is 200 μm, and a thickness of the transparent cover plate 105 is 0.7 mm.

The thicknesses here are only examples. In other implementations, the thickness of each film layer may be larger or smaller, which is not limited in the present disclosure.

The display panel according to the embodiment of the present disclosure is suitable for a touch scheme design in medium and large-sized electronic devices, especially for notebook computer products. By leading touch traces to a plurality of bonding regions, a narrow border of the product can be achieved.

Figure 8:
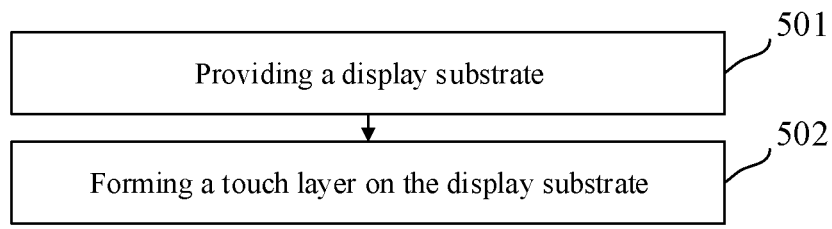
FIG. 8 is a flowchart of a method for manufacturing a display panel according to an embodiment of the present disclosure.

FIG. 8 is a flowchart of a method for manufacturing a display panel according to an embodiment of the present disclosure. Referring to FIG. 8, the method includes the following steps.

In step 501, a display substrate is provided. The display substrate is provided with a display region and a peripheral region surrounding the display region.

In step 502, a touch layer is formed on the display substrate. The touch layer includes a plurality of touch electrodes and a plurality of traces, orthographic projections of the plurality of touch electrodes on the display substrate are within the display region, and orthographic projections of the plurality of traces on the display substrate are within the peripheral region.

Ends of the plurality of traces are respectively connected to corresponding touch electrodes, and the other ends of the plurality of traces are disposed in a plurality of bonding regions arranged at intervals in the touch layer. Orthographic projections of the plurality of bonding regions on the display substrate are within a first peripheral sub-region, the first peripheral sub-region is a partial region, on a side of the display region, of the peripheral region and the plurality of bonding regions are arranged along an extending direction of an outer edge of the first peripheral sub-region.

In the embodiment of the present disclosure, the traces connected to the touch layer extend to the peripheral region on the same side of the display region. By extending the plurality of traces to different bonding regions for bonding, the traces are prevented from extending to the same position. In this way, only the traces in the same bonding region need to be arranged in parallel when extending along a length direction of the first peripheral sub-region, and the traces are prevented from being all arranged in parallel in the first peripheral sub-region so as to prevent a too wide border due to excessively concentrated traces, which helps achieve a narrow border of the display panel.

Figure 9:
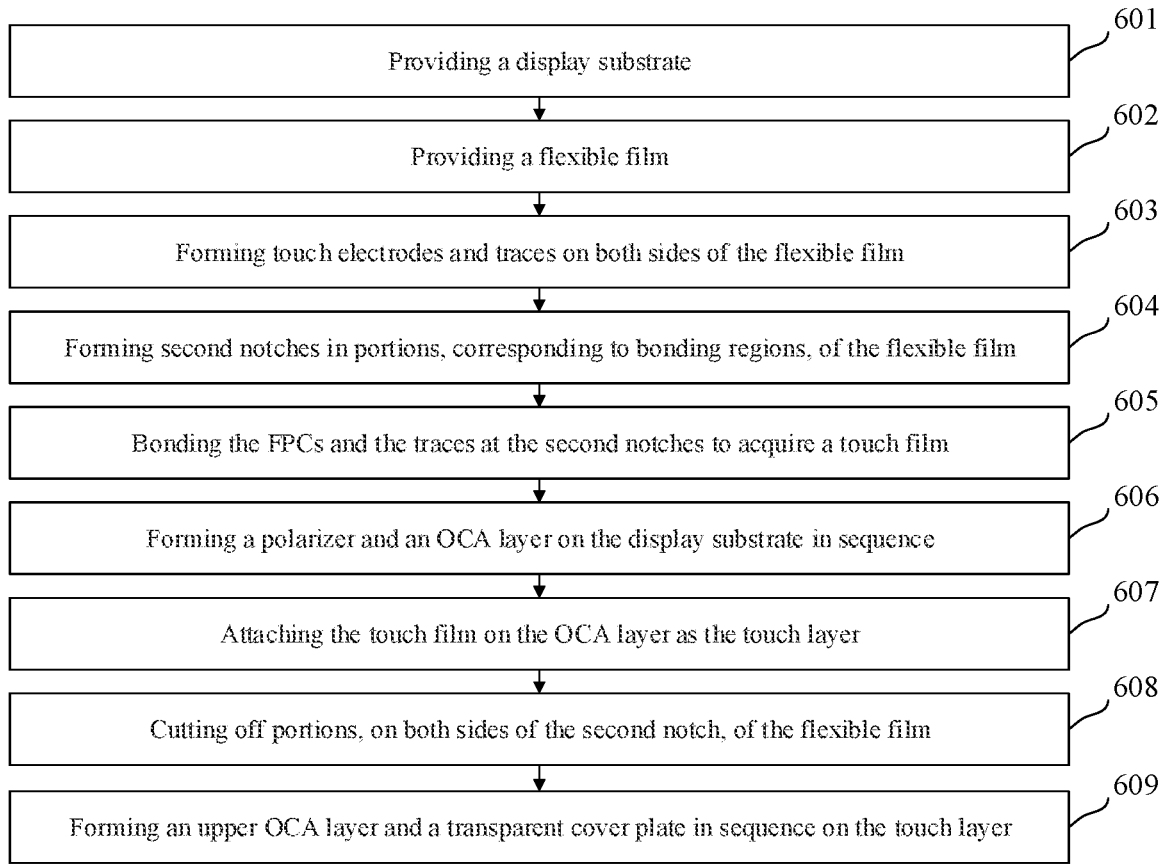
FIG. 9 is a flowchart of a method for manufacturing a display panel according to an embodiment of the present disclosure.

FIG. 9 is a flowchart of a method for manufacturing a display panel according to an embodiment of the present disclosure. Referring to FIG. 9, the method includes the following steps.

In step 601, a display substrate is provided. The display substrate is provided with a display region and a peripheral region surrounding the display region.

For example, the display substrate is an OLED display substrate.

In step 602, a flexible film is provided.

For example, the flexible film is a PET film.

In step 603, touch electrodes and traces are formed on both sides of the flexible film.

Here, the touch electrodes and traces may be formed on both sides of the flexible film by printing.

In step 604, second notches are formed in portions, corresponding to bonding regions, of the flexible film.

Figure 10:
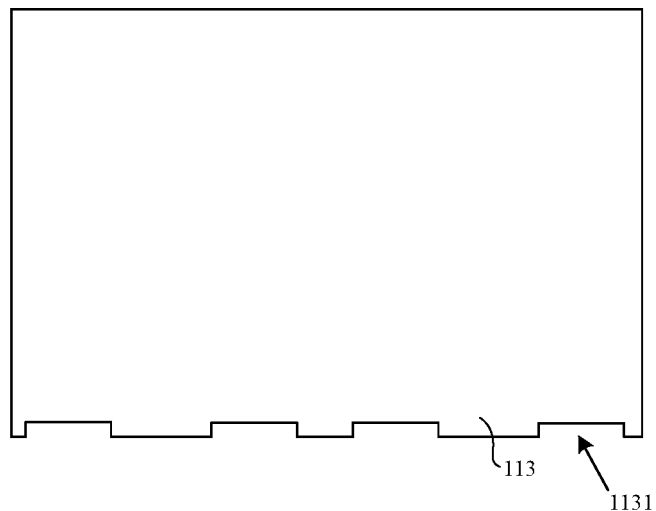
FIG. 10 is a schematic structural diagram of a display panel in a manufacturing process of an embodiment of the present disclosure.

As shown in FIG. 10, four second notches 1131 are formed in portions, corresponding to the bonding regions, of the flexible film 113. The main function of the second notch 1131 is to facilitate bonding of the FPCs and the traces on the flexible film. The second notch only occupies a part of the bonding region, instead of the entire bonding region, and the other part of the bonding region is provided with a touch layer for bonding.

In step 605, the FPCs and the traces are bonded at the second notches to acquire a touch film.

One end of the FPC is bonded to the traces disposed at an edge of the second notch of the flexible film, and then is extended to the outside of the display panel through the second notch. The FPC is bonded before the touch layer is attached to the display substrate, so as to prevent the bonding process from affecting the attaching effect of the touch layer and the display substrate.

In the embodiment of the present disclosure, the FPCs include FPCs bonded on one surface of the touch layer and FPCs bonded on the other surface of the touch layer.

Figure 11:
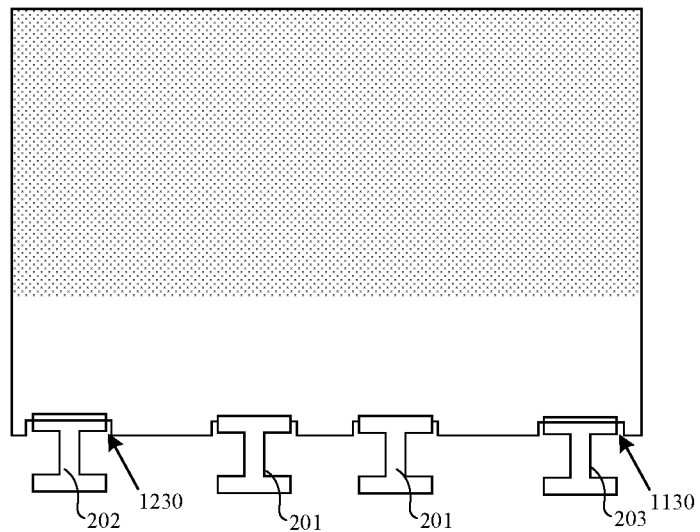
FIG. 11 is a schematic structural diagram of a display panel in a manufacturing process of an embodiment of the present disclosure.

As shown in FIG. 11, four FPCs are respectively bonded at four second notches 1131 of the flexible film 113.

In step 606, a polarizer and an OCA layer are formed on the display substrate in sequence.

For example, step 606 includes the following steps.

Figure 12:
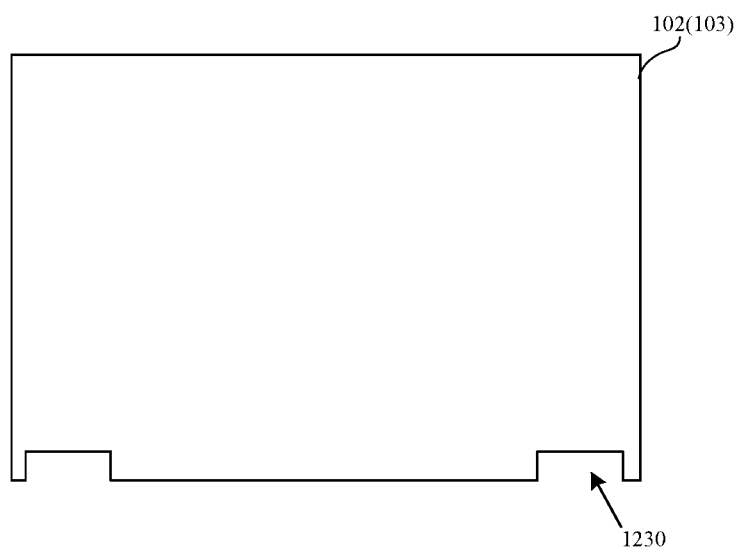
FIG. 12 is a schematic structural diagram of a display panel in a manufacturing process of an embodiment of the present disclosure.

First notches are formed in the polarizer and the OCA layer, wherein the first notch is configured to avoid the FPC on the side, facing the display substrate, of the touch layer. As shown in FIG. 12, two first notches 1230 are formed in the polarizer 102 and the OCA layer 103.

Figure 13:
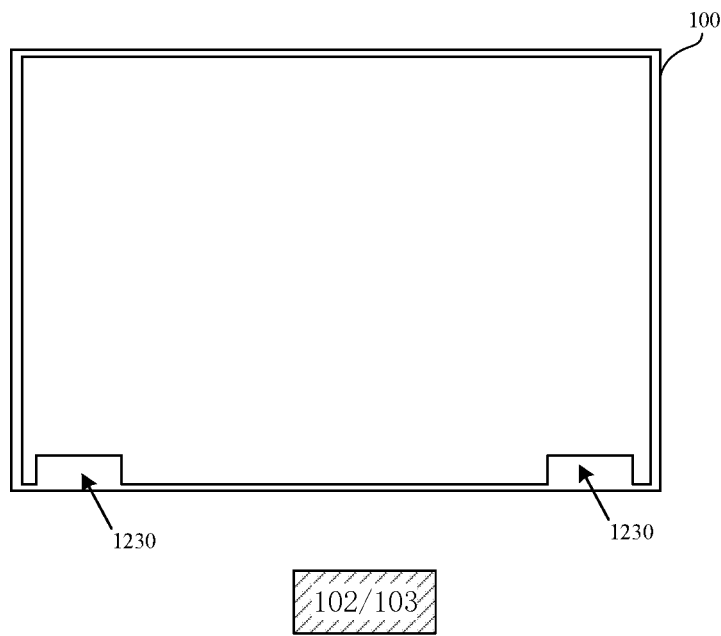
FIG. 13 is a schematic structural diagram of a display panel in a manufacturing process of an embodiment of the present disclosure.

The polarizer and the OCA layer formed with the first notches are attached to the display substrate. As shown in FIG. 13, the polarizer 102 and the OCA layer 103 with the first notches 1230 are attached to the display substrate 100.

For example, the portion, corresponding to the first bonding region, of the polarizer and of the OCA layer is cut off to form the aforementioned first notches. The first bonding region is a bonding region corresponding to the FPC disposed on the side, facing the display substrate, of the touch layer.

A bottom of the polarizer has its own adhesive, so the polarizer may be directly attached to the display substrate.

In step 607, the touch film is attached to the OCA layer as the touch layer, wherein the OCA layer is adhered between the polarizer and the touch layer.

Figure 14:
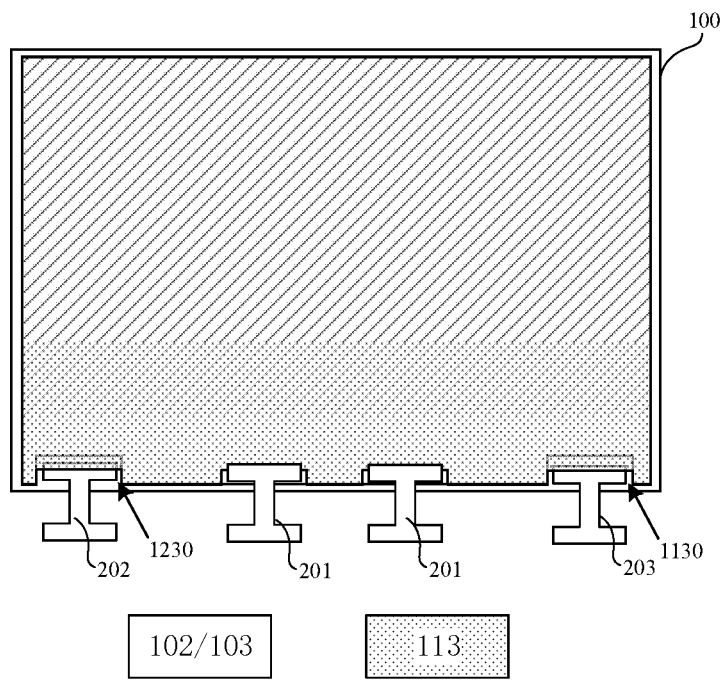
FIG. 14 is a schematic structural diagram of a display panel in a manufacturing process of an embodiment of the present disclosure.

As shown in FIG. 14, the touch layer bonded with the FPCs is attached to the OCA layer 103.

In step 608, portions, on both sides of the second notch, of the flexible film are cut off.

In the embodiment of the present disclosure, through the cutting process of step 604, a portion, at the position of the FPC, of the flexible film is cut off. The FPC is bonded to the cut portion of the flexible film to acquire the touch film, the touch film is attached to the polarizer and the OCA layer, and a second cutting is performed on portions, on both sides of the second notch, of the flexible film in the peripheral region. It should be noted that, after the second cutting, the aforementioned first notches disappear, and corresponding protrusions appear at positions of the FPCs, as shown in the structure shown in FIG. 5. Therefore, the depth of the second cutting may be slightly greater than the depth of the first notch, while the depth of the second cutting is smaller than the width of the peripheral region, such that the second cutting does not affect traces in the peripheral region.

Correspondingly, after step 607, notches are also formed in the polarizer and the OCA layer. After the touch layer is attached to the polarizer and the OCA layer, the second cutting may also be performed on other portion of the polarizer and the OCA which are disposed in the peripheral region. After the second cutting, the second notch becomes smaller, and protrusions correspondingly appear at positions of the FPCs to which no second notch corresponds, as shown in the structure shown in FIG. 5.

The second cutting may be performed simultaneously on the flexible film, the polarizer and OCA layer.

Since the FPC has been partially cut off at the first and second notches, the attached FPC does not affect the cutting of the flexible film, polarizer, and OCA layer, thereby ensuring the shape accuracy.

The polarizer and the OCA layer are provided with the first notches only at positions corresponding to the FPCs on the side, facing the display substrate, of the touch layer. Therefore, the polarizer and the OCA layer are provided with no first notch at positions corresponding to the FPCs on the side, facing away from the display substrate, of the touch layer, and these portions of the polarizer and OCA layer are not cut in the second cutting, such that bigger protrusions are retained, which are bigger than the protrusions retained in the flexible film. Additionally, after FPC is bonded with the touch layer, the protruding portion of the FPC may be in contact with the OCA layer here, so as to achieve the positioning and mechanical fixation of the FPC on the side, facing away from the display substrate, of the touch layer.

In step 609, an upper OCA layer and a transparent cover plate are formed on the touch layer in sequence.

Those of ordinary skill in the art may understand that all or part of the steps for implementing the above-described embodiments may be completed by hardware, or may be completed by relevant hardware instructed by programs, and the programs may be stored in a computer-readable storage medium. The storage medium may be a read-only memory, a magnetic disk or an optical disk, or the like.

The descriptions above are merely optional embodiments of the present disclosure, and are not intended to limit the present disclosure. Any modifications, equivalent substitutions, improvements, and the like made within the spirit and principles of the present disclosure shall be included in the protection scope of the present disclosure.

What is claimed is:

1. A display panel, comprising:
    a display substrate, provided with a display region and a peripheral region surrounding the display region; and
    a touch layer laminated on the display substrate, wherein the touch layer comprises a plurality of touch electrodes, a plurality of traces, and a flexible film, orthographic projections of the plurality of touch electrodes on the display substrate being within the display region, and orthographic projections of the plurality of traces on the display substrate being within the peripheral region, wherein a part of the touch electrodes and the traces are disposed on one surface of the flexible film, and the other part of the touch electrodes and the traces are disposed on the other surface of the flexible film;
    wherein ends of the plurality of traces are connected to the corresponding touch electrodes, and the other ends of the plurality of traces are disposed in a plurality of bonding regions arranged at intervals in the touch layer, orthographic projections of the plurality of bonding regions on the display substrate being within a first peripheral sub-region, the first peripheral sub-region being a partial region, on a side of the display region, of the peripheral region, and the plurality of bonding regions being arranged along an extending direction of an outer edge of the first peripheral sub-region;
    the peripheral region further comprises a second peripheral sub-region and a third peripheral sub-region, wherein the second peripheral sub-region and the third peripheral sub-region are connected to the first peripheral sub-region, and the second peripheral sub-region, the first peripheral sub-region and the third peripheral sub-region are respectively on sides where three connecting borders of the display region are disposed;
    the plurality of traces comprise a first trace, a second trace and a third trace, wherein in an orthographic projection of the touch layer on the display substrate, the first trace is connected to the corresponding touch electrode from a border, close to the first peripheral sub-region, of the display region, the second trace is connected to the corresponding touch electrode from a border, close to the second peripheral sub-region, of the display region, and the third trace is connected to the corresponding touch electrode from a border, close to the third peripheral sub-region, of the display region; and
    the plurality of bonding regions comprise a first bonding region corresponding to the first trace, a second bonding region corresponding to the second trace and a third bonding region corresponding to the third trace; wherein
    the first bonding region is between the second bonding region and the third bonding region;
    the traces in any first bonding region are connected to one first FPC, the traces in any second bonding region are connected to one second FPC, and the traces in any third bonding region are connected to one third FPC; and
    a part of the first FPC, the second FPC and the third FPC are bonded to the traces on one surface of the touch layer, and the other part of the first FPC, the second FPC and the third FPC are bonded to the traces on the other surface of the touch layer.

2. The display panel according to claim 1, wherein a number of the first bonding region is 2, a number of the second bonding region and a number of the third bonding region are both 1; or
    the number of the first bonding region, the number of the second bonding region and the number of the third bonding region are all 1.

3. The display panel according to claim 2, further comprising:
    a driving IC, disposed on the display substrate and in the peripheral region,
    wherein the bonding region and the driving IC are disposed in the first peripheral sub-region and are arranged alternately along the extending direction of the outer edge of the first peripheral sub-region.

4. The display panel according to claim 1, wherein the first FPC is bonded to the traces on the one surface of the touch layer, and the second FPC and the third FPC are bonded to the traces on the other surface of the touch layer.

5. The display panel according to claim 1, further comprising:
    a polarizer, disposed on a first surface of the touch layer; and
    an optically clear adhesive (OCA) layer, adhered between the polarizer and the touch layer;
    wherein edges of the polarizer and the OCA layer are provided with first notches, the first notch being configured to avoid the FPC disposed on the first surface of the touch layer.

6. The display panel according to claim 5, wherein the OCA layer is adhered to each of the FPCs disposed on a second surface of the touch layer, the first surface and the second surface being two opposite surfaces of the touch layer.

7. The display panel according to claim 4, further comprising:
    a polarizer, disposed on a first surface of the touch layer; and
    an optically clear adhesive (OCA) layer, adhered between the polarizer and the touch layer;
    wherein edges of the polarizer and the OCA layer are provided with first notches, the first notch being configured to avoid the FPC disposed on the first surface of the touch layer.

8. The display panel according to claim 4, further comprising:
    a driving IC, disposed on the display substrate and in the peripheral region,
    wherein the bonding region and the driving IC are disposed in the first peripheral sub-region and are arranged alternately along the extending direction of the outer edge of the first peripheral sub-region.

9. The display panel according to claim 1, further comprising:
  a driving IC, disposed on the display substrate and in the peripheral region,
  wherein the bonding region and the driving IC are disposed in the first peripheral sub-region and are arranged alternately along the extending direction of the outer edge of the first peripheral sub-region.

10. The display panel according to claim 1, further comprising:
  a driving IC, disposed on the display substrate and in the peripheral region,
  wherein the bonding region and the driving IC are disposed in the first peripheral sub-region and are arranged alternately along the extending direction of the outer edge of the first peripheral sub-region.

11. A method for manufacturing a display panel, comprising:
  providing a display substrate, wherein the display substrate is provided with a display region and a peripheral region surrounding the display region; and
  forming a touch layer on the display substrate, wherein the touch layer comprises a plurality of touch electrodes and a plurality of traces, orthographic projections of the plurality of touch electrodes on the display substrate being within the display region, and orthographic projections of the plurality of traces on the display substrate being within the peripheral region;
  wherein ends of the plurality of traces are connected to the corresponding touch electrodes, and the other ends of the plurality of traces are disposed in a plurality of bonding regions arranged at intervals in the touch layer, orthographic projections of the plurality of bonding regions on the display substrate being with a first peripheral sub-region, the first peripheral sub-region being a partial region, on a side of the display region, of the peripheral region, and the plurality of bonding regions being arranged along an extending direction of an outer edge of the first peripheral sub-region; wherein
  forming the touch layer on the display substrate comprises:
  manufacturing a touch film;
  forming a polarizer and an optically clear adhesive (OCA) layer in sequence on the display substrate; and
  attaching the touch film to the OCA layer as the touch layer, wherein the OCA layer is adhered between the polarizer and the touch layer; and
  manufacturing the touch film comprises:
  providing a flexible film;
  forming the touch electrodes and the traces on both surfaces of the flexible film;
  forming second notches in portions, corresponding to the bonding regions, of the flexible film; and
  bonding FPCs and the traces at the second notches; and
  cutting off portions, on both sides of the second notch, of the flexible film.

12. The method according to claim 11, wherein the FPCs comprise FPCs bonded on one surface of the touch layer and FPCs bonded on the other surface of the touch layer; and
  forming the polarizer and the OCA layer in sequence on the display substrate comprises:
  forming first notches in the polarizer and the OCA layer, the first notches being configured to avoid the FPCs disposed on the one surface of the touch layer; and
  attaching the polarizer and the OCA layer formed with the first notches to the display substrate.

* * * * *

UNITED STATES PATENT AND TRADEMARK OFFICE
CERTIFICATE OF CORRECTION

PATENT NO. : 12,147,627 B2
APPLICATION NO. : 17/783090
DATED : November 19, 2024
INVENTOR(S) : Ren Xiong et al.

Page 1 of 1

It is certified that error appears in the above-identified patent and that said Letters Patent is hereby corrected as shown below:

On the Title Page

Item (86) should read:
PCT No.: PCT/CN2021/081893
371 (c)(1), (2) Date: Jun. 7, 2022

Signed and Sealed this
Tenth Day of June, 2025

Coke Morgan Stewart
*Acting Director of the United States Patent and Trademark Office*